(12) United States Patent
DeFrank et al.

(10) Patent No.: US 9,107,553 B2
(45) Date of Patent: Aug. 18, 2015

(54) WIPER BLADE

(75) Inventors: James B. DeFrank, Thousand Oaks, CA (US); Russell E. Romer, Canyon Lake, CA (US); Amir James Dia, Torrance, CA (US)

(73) Assignees: James DeFrank, Thousand Oaks, CA (US); Loraine DeFrank, Thousand Oaks, CA (US)

( * ) Notice: Subject to any disclaimer, the term of this patent is extended or adjusted under 35 U.S.C. 154(b) by 893 days.

(21) Appl. No.: 12/853,227

(22) Filed: Aug. 9, 2010

(65) Prior Publication Data

US 2011/0030725 A1    Feb. 10, 2011

Related U.S. Application Data

(60) Provisional application No. 61/232,333, filed on Aug. 7, 2009.

(51) Int. Cl.
| | | |
|---|---|---|
| *B60S 1/04* | (2006.01) |
| *A47L 13/11* | (2006.01) |
| *A47L 1/06* | (2006.01) |
| *B60S 3/04* | (2006.01) |

(52) U.S. Cl.
CPC . *A47L 13/11* (2013.01); *A47L 1/06* (2013.01); *B60S 3/045* (2013.01)

(58) Field of Classification Search
CPC ............ B60S 3/045; A47L 13/11; A47L 1/06
USPC ............ 15/245, 245.1, 250.8, 143.1, 250.001
See application file for complete search history.

(56) References Cited

U.S. PATENT DOCUMENTS

| | | | | |
|---|---|---|---|---|
| 3,018,501 | A * | 1/1962 | Oishei ..................... | 15/250.452 |
| 3,040,359 | A * | 6/1962 | Deibel ..................... | 15/250.48 |
| 3,080,596 | A * | 3/1963 | Symbolik ............... | 15/250.48 |
| 3,428,997 | A * | 2/1969 | Rickett .................... | 15/250.48 |
| 3,667,083 | A * | 6/1972 | Linker ..................... | 15/250.06 |
| 4,006,510 | A * | 2/1977 | Teixeira Soares ....... | 15/245 |
| 4,028,770 | A * | 6/1977 | Appel ...................... | 15/250.43 |
| 4,363,155 | A * | 12/1982 | Regina .................... | 15/236.02 |
| D279,933 | S * | 7/1985 | Gaines .................... | D32/46 |
| 4,637,090 | A * | 1/1987 | Kennedy ................. | 15/236.08 |
| 4,638,525 | A * | 1/1987 | Sugita et al. ............ | 15/250.48 |
| 4,722,112 | A * | 2/1988 | Schaub et al. ........... | 15/250.451 |
| 4,922,569 | A * | 5/1990 | Brinker et al. .......... | 15/105 |
| 5,478,605 | A * | 12/1995 | Ichise ...................... | 427/276 |
| 5,644,814 | A * | 7/1997 | Jeffer ...................... | 15/250.361 |
| 5,711,049 | A * | 1/1998 | Abbott et al. ........... | 15/250.454 |
| 5,724,700 | A * | 3/1998 | Marks ..................... | 15/250.41 |
| D422,124 | S * | 3/2000 | Rimback ................. | D32/41 |
| 6,038,729 | A * | 3/2000 | Feigenbaum ............ | 15/250.41 |
| 6,115,876 | A * | 9/2000 | Zimmer .................. | 15/250.48 |
| 6,163,922 | A * | 12/2000 | Fisher et al. ............ | 15/250.48 |
| 6,230,358 | B1 * | 5/2001 | Sahara .................... | 15/250.48 |

(Continued)

*Primary Examiner* — Monica Carter
*Assistant Examiner* — Michael Jennings
(74) *Attorney, Agent, or Firm* — Inskeep IP Group, Inc.

(57) ABSTRACT

A wiper blade configured to efficiently remove liquids from a surface without damaging or removing surface treatments. The wiper blade comprises a flexible, molded silicone body having a handle and a v-shaped wiping tip. In certain embodiments, the wiper blade comprises multiple v-shaped wiping tips each configured to remove liquids from surfaces having and surrounded by different features. In certain other embodiments, the v-shaped wiping tip extends beyond the handle so as to provide for removal of liquids in narrow, hard to access locations.

6 Claims, 2 Drawing Sheets

(56) References Cited

U.S. PATENT DOCUMENTS

| | | | |
|---|---|---|---|
| 6,233,779 B1 * | 5/2001 | Nelson, Sr. | 15/250.41 |
| 6,671,922 B1 * | 1/2004 | Geilenkirchen et al. | 15/250.48 |
| 6,813,803 B2 * | 11/2004 | Leutsch | 15/250.48 |
| D571,968 S * | 6/2008 | Talesfore et al. | D32/41 |
| 7,555,806 B1 * | 7/2009 | James | 15/250.41 |
| 7,568,256 B1 * | 8/2009 | Addison | 15/250.06 |
| 7,568,258 B2 * | 8/2009 | Jeuffe | 15/250.48 |
| D612,118 S * | 3/2010 | Williams | D32/41 |
| D625,064 S * | 10/2010 | Lee | D32/42 |
| 7,810,206 B2 * | 10/2010 | Weiler et al. | 15/250.201 |
| 7,823,247 B2 * | 11/2010 | Poton | 15/250.32 |
| 7,845,044 B2 * | 12/2010 | Park | 15/250.43 |
| 8,186,003 B2 * | 5/2012 | Ohta et al. | 15/250.361 |
| 8,201,300 B2 * | 6/2012 | Cutler | 15/245 |
| 2001/0039690 A1 * | 11/2001 | Reo | 15/250.48 |
| 2002/0000018 A1 * | 1/2002 | Kotlarski et al. | 15/250.201 |
| 2004/0148728 A1 * | 8/2004 | Vogt et al. | 15/250.48 |
| 2004/0237229 A1 * | 12/2004 | Hiruma et al. | 15/51 |
| 2006/0010635 A1 * | 1/2006 | Varner | 15/245 |
| 2006/0042035 A1 * | 3/2006 | Liu | 15/245 |
| 2006/0254009 A1 * | 11/2006 | Tsai et al. | 15/121 |
| 2007/0017056 A1 * | 1/2007 | Cooke et al. | 15/250.201 |
| 2007/0022556 A1 * | 2/2007 | Walworth et al. | 15/250.201 |
| 2007/0061994 A1 * | 3/2007 | Lee | 15/250.201 |
| 2008/0040880 A1 * | 2/2008 | Hiruma et al. | 15/250.48 |
| 2008/0263811 A1 * | 10/2008 | Sharabura et al. | 15/250.48 |
| 2008/0289136 A1 * | 11/2008 | Ohta et al. | 15/250.48 |
| 2009/0241282 A1 * | 10/2009 | Marc | 15/250.48 |

* cited by examiner

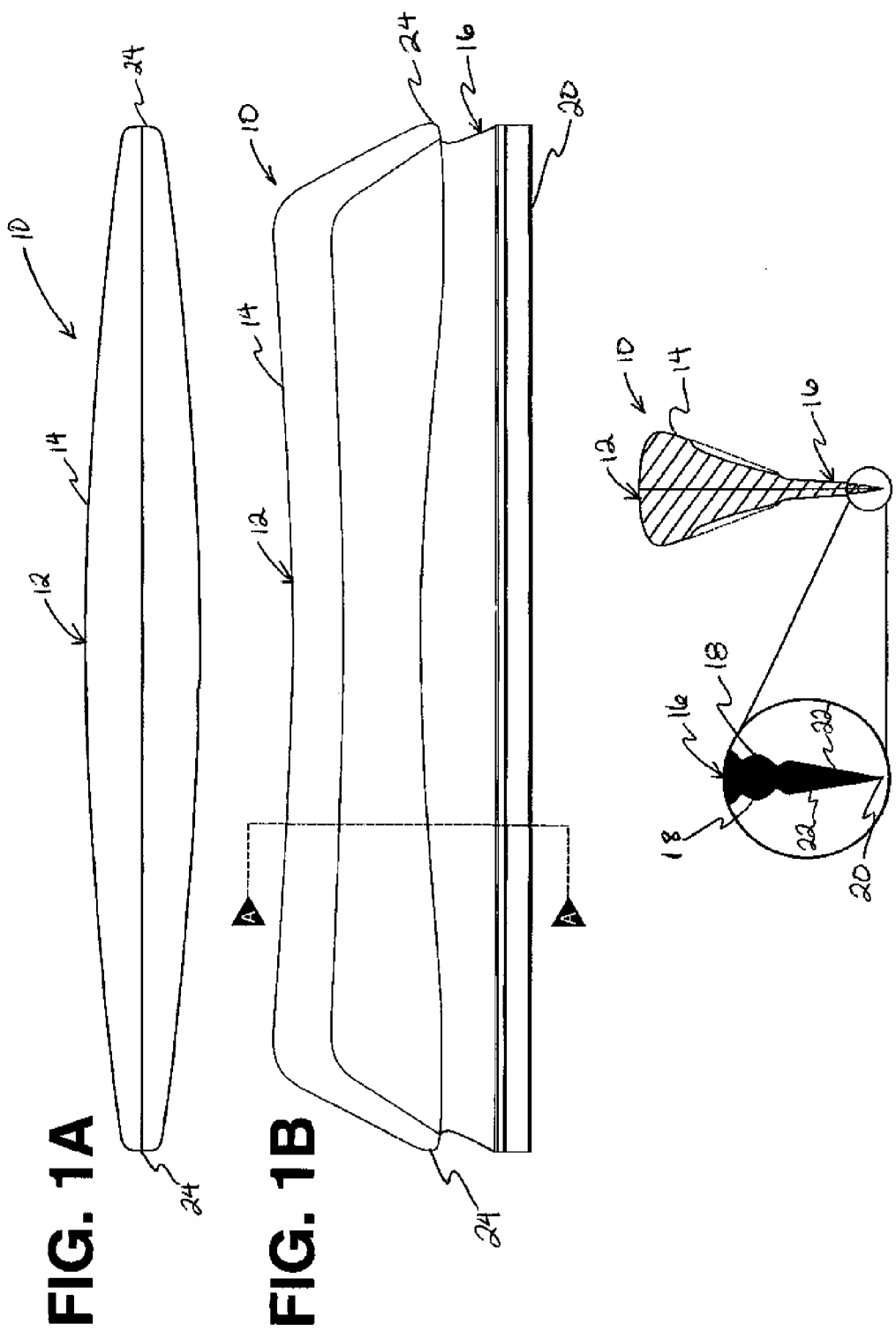

WIPER BLADE

RELATED APPLICATIONS

This application claims priority to U.S. Provisional Application Ser. No. 61/232,333 filed Aug. 7, 2009, entitled WIPER BLADE, the contents of which are incorporated in their entirety herein.

FIELD OF THE INVENTION

The present invention relates to car wash accessories and particularly to hand-held devices for removing water and other liquids from surfaces of automobiles and other items for which surface liquid removal is desired.

BACKGROUND OF THE INVENTION

Many feel that drying a car is the most critical step in the car washing process. Drying can either be effected via evaporation with blowers or mechanical removal, such as towels or pliable wiper blades.

Large, industrial air blowers are often used in automated car washes and the like. More discerning car owners eschew automated carwashes for hand washing, and may use hand held air blowers, which are typically difficult because they are cumbersome, awkward, and rather heavy to hold for the time it takes to dry a car body. Furthermore, power cords can get in the way while working on an automobile surface, and cause scratches and other damage as well. In addition, electricity and or battery costs may be a deterrent to those having to wash multiple automobiles such as would be the case with a car dealership, etc.

Typical mechanical methods are similarly flawed. Towels, for example, become saturated quickly and leave streaks. Additionally, towels trap dirt and can result in scratches in the vehicle's finish. Blades do not rely on absorbing the water and, as such, do not leave streaks. However, due to the convoluted shapes of most vehicles, typical blades do not conform to the surface of the vehicle.

What is clearly needed is a method and apparatus for removing standing water from surfaces that is easily used with the compound and radical curvature of automobile bodies, and around rivet heads and other projections from surfaces to be dried, and is at the same time gentle to surface finishes, easy to use, inexpensive, and durable. Several examples of attempts to respond to those needs are disclosed in U.S. Pat. Nos. 7,363,678; 7,134,163; 6,243,911; 6,126,756; and 5,920,947, the contents of which are each hereby incorporated by reference in their entirety. However, these attempts still raise questions in connection with ease of use, expense and durability, to name a few. And it is to these objects and others that the present invention is dedicated, and apparatus and methods are taught herein in enabling detail for accomplishing these ends.

OBJECTS AND SUMMARY OF THE INVENTION

In a preferred embodiment of the present invention, a liquid-wiping apparatus for wiping standing liquids from a surface is provided. Examples of this and other preferred embodiments are set forth in the following description and drawings.

BRIEF DESCRIPTION OF THE DRAWINGS

FIG. 1A is a plan view of one embodiment of the wiper blade of the present invention.

FIG. 1B is a front elevation view of one embodiment of the wiper blade of the present invention.

FIG. 1C is a magnification of the lower portion of FIG. 1D.

FIG. 1D is a sectional view taken along line A-A of FIG. 1B.

DESCRIPTION OF EMBODIMENTS

Figure 2A:
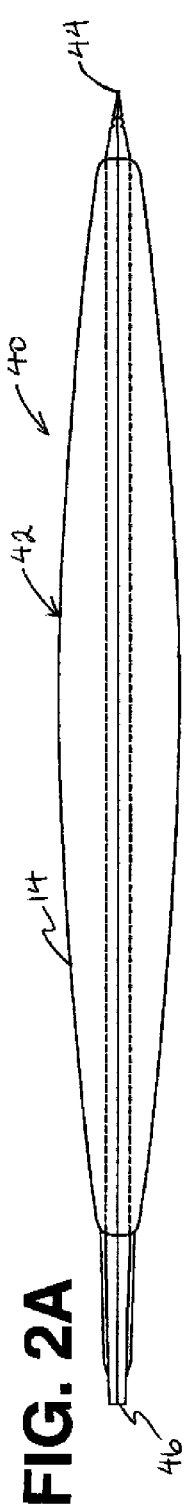
FIG. 2A is a plan view of one embodiment of the wiper blade of the present invention.
Figure 2B:
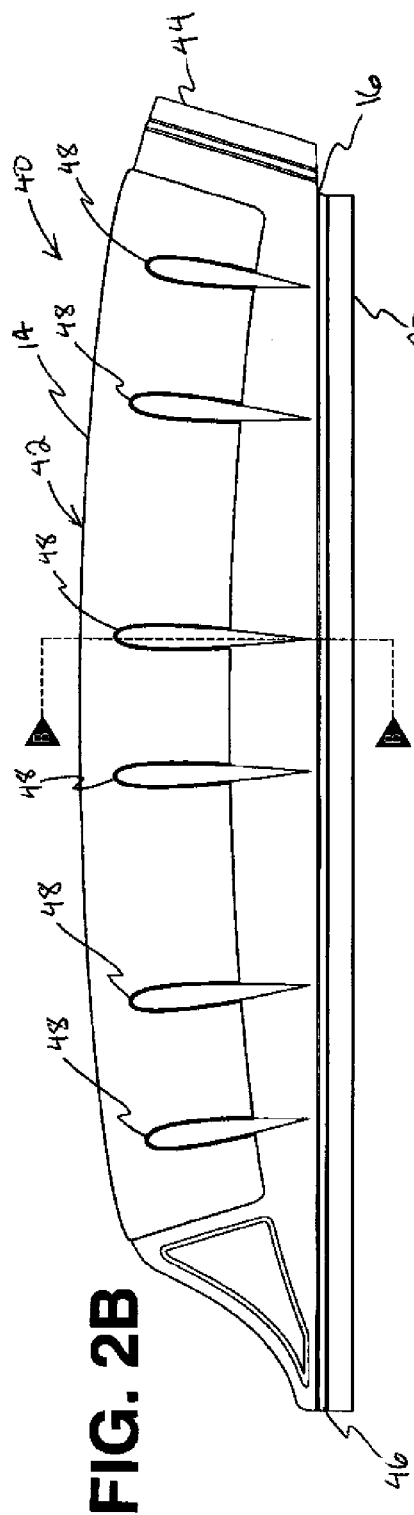
FIG. 2B is a front elevation view of one embodiment of the wiper blade of the present invention.
Figures 2C, 2D:
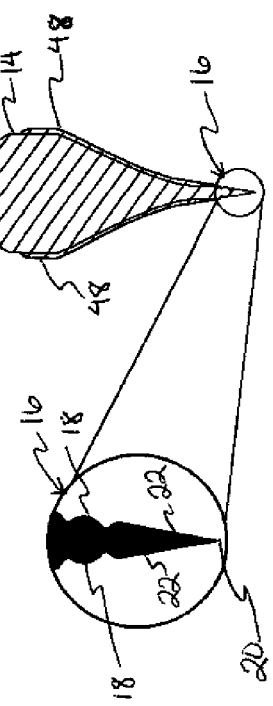
FIG. 2C is a magnification of the lower portion of FIG. 2D.
FIG. 2D is a sectional view taken along line B-B of FIG. 2B.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

A wiper blade in accordance with one exemplary embodiment of the present invention is shown in FIGS. 1A through 1D. A wiper blade 10 comprises a body 12. As shown in the sectional view of FIG. 1D, the body 12 has a generally triangular cross-sectional shape that employs a blunt or bulbous-shaped proximal portion 14 that tapers to a distal portion 16. Stated alternatively, the thickness of the body 12 generally decreases from the proximal portion 14 to the distal portion 16.

The proximal portion 14 is an ergonomically shaped handle to be grasped or held in the hand of a user without causing hand fatigue. The proximal portion employs a textured surface to enhance a frictional grip by the user, a feature particularly important in light of the fact that the wiper blade 10 will be used when wet. The textured surface may be employed to all or a portion of the proximal portion 14 and may comprise a repeating pattern, an irregular pattern, recessed or raised text such as use instructions and logos, or a combination thereof.

The distal portion 16 of the body 12 is intended for contact with the surface from which the user wishes to remove water or other liquids. As shown best in FIGS. 1C and 1D, the distal portion 16 comprises recessed section 18 positioned proximal of a distal wiping tip or side 20. The recessed section 18 increases the flexibility of the distal portion of the body 12 to move in opposing directions, for example, when a user switches from a left to a right direction when wiping the wiper blade 10 across a surface. The recessed section 18 shown in FIG. 1C employs two sets of symmetrical indentions in the distal portion 16. However, it will be recognized that the recessed section 18 may also employ a single set of symmetrical indentions, one or more sets of asymmetrical indentions, or a combination thereof in order to affect the desired flexibility of the distal portion 16. To facilitate the efficient removal of liquids from surfaces, sides 22 of the distal portion 16 are generally smooth and tapered to the distal wiping tip 20.

The body 12 of the wiper blade 10 has a molded silicone construction that flexes and twists in a wide range of directions in order to enhance the wiper blade's 10 ability to conform to a variety of surface shapes and contours. The body 12 of the wiper blade 10 is constructed so as not to have any sharp or flat ends that could scratch or otherwise damage the surface or the structures near the surface from which the liquid is to be removed.

The body 12 may, for example, have a length of approximately twelve inches, a maximum thickness at the proximal portion 14 of approximately 1.25 inches, and a length from the proximal portion 14 to the distal wiping tip 20 of approximately 2.27 inches. As shown in FIG. 1A, the ends 24 of the body 12 are thinner than the middle of the proximal portion 14 in order to maximize lateral flexibility of the body 12.

In operation, a user grasps the proximal portion 14 of the body 12 of the wiper blade 10, places the distal wiping tip 20 of the wiper blade 10 on a surface, and displaces the wiper blade across a surface. The v-shaped distal wiping tip 20 of the distal portion 16 of the body 12 wipes the surface clean in a manner that is similar to the contact of a windshield wiper blade against a windshield.

As shown in FIGS. 2A-2D, in a second embodiment of the wiper blade of the present invention, a wiper blade 40 comprises a body 42 having a cross-sectional shape and construction similar to that described above. However, the body 42 of the wiper blade 40 differs from the previously described embodiment in that a first end 44 and a second end 46 of the body 42 are configured to provide additional wiping features. For example, the first end 44 of the body forms an additional or second v-shaped wiping tip that is molded into the body 42. The wiping tip formed by the first end 42 is effective in wiping surfaces that are recessed, such as the glass surfaces of the side mirror of an automobile.

At the opposite end of the body 42, the second end 46 forms an extension of the distal wiping tip 20 beyond the proximal portion 14. Alternatively stated, a length from the proximal portion 14 to the distal wiping tip 20 at the second end 46 is significantly reduced. The extension or reduced length of the second end 46 allows the second end 46 to reach into or under confined areas for liquid removal.

Furthermore, the body 42 of the wiping blade 40 employs reinforcing ribs 48. The reinforcing ribs 48 are molded into the body 42 to enhance the rigidity of the body 42 between the proximal portion 14 and the distal portion 16. This increased rigidity enhances the contact between the surface on which the wiper blade 40 is being used and the distal wiping tip 20.

The body 42 may, for example, have a length of approximately 13.5 inches, a maximum thickness at the proximal portion 14 of approximately 1.25 inches, and a length from the proximal portion 14 to the distal wiping tip 20 of approximately 2.27 inches. As shown in FIG. 2A, the ends 42 and 44 of the body 42 are thinner than the middle of the proximal portion 14 in order to maximize lateral flexibility of the body 42.

It will be understood that some or all of the features described above regarding the wiper blade 40 may also be incorporated into the wiper blade 10 and vise versa.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A wiper blade comprising:
a flexible body having:
a handle ergonomically shaped for grasping by a hand of a user, the handle extending longitudinally along a proximal portion of the body;
a first v-shaped wiping tip extending longitudinally along a tapered distal portion of the body approximately parallel to the handle, an end of the v-shaped wiping tip forming a longitudinal extension beyond the handle;
a pair of opposing indentations formed within each side of the tapered distal portion of the body between the handle and the v-shaped wiping tip, the opposing indentations extending parallel to the v-shaped wiping tip;
a second v-shaped wiping tip independent of the first v-shaped wiping tip formed at a first longitudinal end of the body, when the body is viewed in elevation perpendicular to a maximum dimension of the body;
a plurality of reinforcing ribs molded into the body so as to increase a rigidity of the body between the handle and the first v-shaped wiping tip, the plurality of reinforcing ribs, when viewed in elevation perpendicular to a maximum dimension of the body, extending beyond the handle towards the first v-shaped wiping tip.

2. The wiper blade of claim 1 wherein the body comprises silicone.

3. The wiper blade of claim 1 wherein the proximal portion of the body is seamlessly molded to the distal portion of the body.

4. The wiper blade of claim 1 wherein, when the body is viewed in cross-section, the proximal portion has a thickness greater than a thickness of the distal portion.

5. The wiper blade of claim 1 wherein the proximal portion comprises a textured surface.

6. The wiper blade of claim 1 wherein, when viewed in elevation perpendicular to a maximum dimension of the body, the first v-shaped wiping tip has a longitudinal length greater than a longitudinal length of the proximal portion.

* * * * *